United States Patent
Zhao et al.

(10) Patent No.: US 10,053,559 B2
(45) Date of Patent: Aug. 21, 2018

(54) TIRE WITH TREAD CONTAINING FUNCTIONALIZED POLYBUTADIENE RUBBER AND REINFORCING FILLER CONTAINING PRECIPITATED SILICA

(71) Applicant: The Goodyear Tire & Rubber Company, Akron, OH (US)

(72) Inventors: Junling Zhao, Hudson, OH (US); Roberto Cerrato Meza, North Canton, OH (US); Warren James Busch, North Canton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 14/970,584

(22) Filed: Dec. 16, 2015

(65) Prior Publication Data

US 2017/0174873 A1    Jun. 22, 2017

(51) Int. Cl.
*C08L 9/00* (2006.01)
*C08L 15/00* (2006.01)
*B60C 1/00* (2006.01)

(52) U.S. Cl.
CPC .............. *C08L 9/00* (2013.01); *B60C 1/0016* (2013.01); *C08L 15/00* (2013.01); *B60C 2200/06* (2013.01)

(58) Field of Classification Search
CPC .......................................................... C08L 9/00
USPC .................................................. 524/526, 493
See application file for complete search history.

(56) References Cited

U.S. PATENT DOCUMENTS

| | | | |
|---|---|---|---|
| 7,081,505 B2 | 7/2006 | Sommazzi et al. | |
| 8,426,512 B2 * | 4/2013 | Zhang | B60C 1/0016 152/209.5 |
| 8,592,515 B2 | 11/2013 | Francik et al. | |
| 2013/0165578 A1 | 6/2013 | Francik et al. | |
| 2014/0100339 A1 | 4/2014 | Ozawa et al. | |

\* cited by examiner

*Primary Examiner* — Kelechi C Egwim
(74) *Attorney, Agent, or Firm* — Henry C. Young, Jr.

(57) ABSTRACT

Pneumatic rubber tire intended for heavy duty service having a tread containing a combination of functionalized cis 1,4-polybutadiene rubber and reinforcing filler containing precipitated silica.

5 Claims, No Drawings

US 10,053,559 B2

TIRE WITH TREAD CONTAINING FUNCTIONALIZED POLYBUTADIENE RUBBER AND REINFORCING FILLER CONTAINING PRECIPITATED SILICA

FIELD OF THE INVENTION

Pneumatic rubber tire intended for heavy duty service having a ground-contacting tread of a rubber composition containing a combination of functionalized cis 1,4-polybutadiene rubber with reinforcing filler which contains precipitated silica.

BACKGROUND OF THE INVENTION

Pneumatic rubber tires intended for heavy duty service conventionally have a tread with a cap/base layered construction where the outer rubber cap layer contains the running surface of the tread (intended to be ground-contacting) and where the composition of the outer tread cap rubber layer elastomer is comprised primarily of natural cis 1,4-polyisoprene rubber and is therefore natural rubber-rich. Such tire treads often contain a minor amount of cis 1,4-polybutadiene rubber to promote resistance to treadwear for the tire. Filler reinforcement for the tread rubber may be, for example, rubber reinforcing carbon black and may also include precipitated silica together with a coupling agent for the precipitated silica.

Polybutadiene rubber is often not considered as being suitable as a primary elastomer for heavy duty tire treads (e.g. truck tire treads) because of, for example, difficulty in processing uncured cis 1,4-polybutadiene rubber, particularly high viscosity cis 1,4-polybutadiene rubber.

Therefore, a challenge is presented for evaluating whether a synthetic rubber, namely synthetic cis 1,4-polybutadiene rubber, may be used to replace a significant amount of natural rubber normally used for such heavy duty tire treads, intended to be road contacting, to enhance processing of the uncured rubber composition in combination with achieving suitable resistance to tire treadwear (abrasion resistance) for the cured rubber composition, which are desirable rubber composition properties for the heavy duty tread cap rubber intended to be ground contacting, namely the outer, ground-contacting portion, or layer, of the tire tread.

For such evaluation, it is desired to evaluate utilization of a rubber composition containing synthetic functionalized cis 1,4-polybutadiene rubber containing filler reinforcement comprised of hydrophobated precipitated silica, particularly with a relatively minimal content of rubber reinforcing carbon black.

For such evaluation, a combination of functionalized cis 1,4-polybutadiene rubber containing functional groups reactive with hydroxyl groups on precipitated silica of the rubber reinforcing filler in combination with cis 1,4-polyisoprene rubber is to be undertaken.

Tire components such as tire sidewall and tread sub-tread (tread base rubber layer) have been suggested which contain precipitated silica and functionalized cis 1,4-polybutadiene rubber. For example, see U.S. Pat. No. 8,426,512.

However, this invention relates to a tire having a tread intended for heavy duty service in a sense of requiring its outer tread cap (the portion, or outer layer, of the tread intended to be ground-contacting) rubber composition to be comprised of functionalized cis 1,4-polybutadiene rubber and cis 1,4-polyisoprene rubber, particularly natural cis 1,4-polyisoprene rubber, and particularly where the rubber composition contains a significant content of the functionalized cis 1,4-polybutadiene rubber.

In one aspect, it is desired that the functionalized cis 1,4-polybutadiene rubber is exclusive of a tin or silicon coupled, cis 1,4-polybutadiene rubber.

The hydrophobated precipitated silica for this invention is contemplated as a precipitated silica pre-hydrophobated (prior to its addition to the rubber composition) or hydrophobated in situ within the rubber composition with a silica coupler comprised of a bis(3-trialkoxysilylalkyl) polysulfide with an average of from 2 to 3.8, alternately from 2 to about 2.6 or from about 3.4 to about 3.8, connecting sulfur atoms in its polysulfidic bridge, or is comprised of an alkoxyorganomercaptosilane. The bis(3-trialkoxysilylalkl) polysulfide may be, for example, comprised of bis(3-triethoxysilylpropyl) polysulfide.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

DISCLOSURE AND PRACTICE OF THE INVENTION

In accordance with this invention, a pneumatic rubber tire is provided having a circumferential rubber tread intended to be ground-contacting where said tread is a rubber composition comprised of, based on parts by weight per 100 parts by weight of the tread rubber (phr):

(A) conjugated elastomer(s) comprised of:
(1) about 40 to about 100, alternately from about 50 to about 80, phr of cis 1,4-polybutadiene rubber, wherein said cis 1,4-polybudiene rubber is comprised of:
  (a) about 40 to about 100, alternately from about 50 to about 80, weight percent of functionalized cis 1,4-polybutadiene rubber,
  wherein said functionalized cis 1,4-polybutadiene rubber is:
    (i) end-chain functionalized (contains functional groups at the end of the polybutadiene elastomer chain), or
    (ii) in-chain functionalized (contains functional groups bound in the polybutadiene elastomer chain,
  wherein said functional groups for said functionalized cis 1,4-polybutadiene rubber are comprised of at least one of amine, siloxy, thiol, imine, amide and epoxy groups reactive with hydroxyl groups on said precipitated silica, and
  (b) from 0 to about 60, alternately from about 20 to about 50, weight percent of cis 1,4-polybutadiene rubber (non-functionalized polybutadiene rubber), and
(2) from zero to about 60, alternately from about 20 to about 50, phr of additional conjugated diene-based elastomer comprised of:
  (a) about 20 to about 100, alternately from about 40 to about 100, weight percent cis 1,4-polyisoprene rubber, wherein said cis 1,4-polyisoprene rubber is comprised of natural cis 1,4-polyisoprene rubber and/or synthetic cis 1,4-polyisoprene rubber, and
  (b) from zero to about 80, alternately from zero to about 60 weight percent styrene/butadiene rubber, and (B) about 40 to about 110, alternately from about 50 to about 80, phr of reinforcing filler comprised of a combination of precipitated silica (amorphous synthetic precipitated silica) and rubber reinforcing carbon black comprised of:
(1) a minimal amount of from about 2 to about 15, alternately from about 3 to about 12, phr of said rubber reinforcing carbon black, or
(2) about 20 to about 50, alternately from about 35 to about 50, phr of said rubber reinforcing carbon black; and wherein said precipitated silica is comprised of precipitated silica hydrophobated with a coupling agent having a moiety reactive with hydroxyl groups (e.g. silanol groups) on said precipitated silica and another different moiety interactive with said diene-based elastomer(s);

wherein said precipitated silica is:
(3) hydrophobated by reaction with said coupling agent in situ within said rubber composition rubber composition, or
(4) pre-hydrophobated by reaction with said coupling prior to addition to its said rubber composition; and wherein said coupling agent for said hydrophobation of said precipitated silica (said hydrophobation in situ and pre-hydrophobation of said precipitated silica) is comprised of bis (3-trialkoxysilylpropyl) polysulfide (for example comprised of a bis(3-triethoxysilylpropyl) polysulfide) containing an average of from 2 to about 3.8, alternately from 2 to about 2.6 or from about 3.4 to about 3.8, connecting sulfur atoms in its polysulfidic bridge or with an alkoxyorganomercaptosilane.

In further accordance with this invention said precipitated silica is bonded to said functionalized cis 1,4-polybutadiene rubber by said functional group(s) on said functionalized cis 1,4-polybutadiene rubber through hydroxyl groups of said precipitated silica.

In one embodiment, said functional groups for said functionalized cis 1,4-polybutadiene rubber are exclusive of pyrrolidine based compounds (e.g. including pyrrolidine ethyl styrene, vinyl benzyl pyrrolidine and vinyl benzyl dimethyl pyrrolidine).

In one embodiment, said functional groups for said functionalized cis 1,4-polybutadiene rubber are exclusive of tetramethylethylene diamine.

In one embodiment, the functionalized cis 1,4-polybutadiene rubber is exclusive of repeat units (in the polymer chain) comprised of other diene based monomers, such as for example, isoprene.

In one embodiment, the rubber composition is exclusive of functionalized styrene/butadiene rubber.

In one embodiment, said functionalized cis 1,4-polybutadiene elastomer has a cis 1,4-isomeric configuration of at least 85 percent.

In one embodiment, said cis 1,4-polybutadiene elastomer (non-functionalized polybutadiene elastomer) has a cis 1,4-isomeric configuration of at least 95 percent.

In further accordance with the invention, a tire is provided having a component comprised of said rubber composition. Representative of such tire components is for example, a tire tread and particularly an outer portion of a tire tread intended to be ground-contacting.

A significant aspect of this invention is the providing a tire with tread intended to be ground-contacting of a rubber composition containing a combination of said functionalized cis 1,4-polybutadiene rubber and hydrophobated precipitated silica, particularly with only a minimal rubber reinforcing carbon black content.

It is to be appreciated that the inclusion of only a minimal rubber reinforcing carbon black content of up to about 15 phr is provided to promote a lower hysteresis of the cured rubber composition as would be evidenced by promotion of a higher physical rebound property and thereby a predictive lower rolling resistance for a tire with such an outer tread layer intended to be ground contacting to thereby promote a greater fuel economy for the associated vehicle.

Therefore, in one aspect of the invention, the representative discovery is for the tire tread outer rubber layer to be comprised of the functionalized cis 1,4-polybutdiene rubber in combination with the hydrophobated precipitated silica and said minimal rubber reinforcing carbon black content.

This is considered herein to be significant in a sense that such practice is considered herein to be a departure from most past practices for a heavy duty tire tread of which its elastomer would otherwise normally be expected to be primarily composed of natural cis 1,4-polyisoprene rubber with a relatively low cis 1,4-polybutadiene rubber content and with a significant rubber reinforcing carbon black reinforcement with the precipitated silica usually being an optional inclusion.

In one embodiment of the invention, for the reinforcing filler, said rubber reinforcing carbon black, which may used in a relatively minimal amount, is a relatively small particle sized, high structure, rubber reinforcing carbon black having an Iodine adsorption value (ASTM D1510) in a range of about 110 to about 145 g/kg, which is indicative of a relatively small sized carbon black together with a dibutylphthalate (DBP) value (ASTM D2414) in a range of about 110 to about 140, cc/100 g, which is indicative of a high structure carbon black. Representative of such small sized, high structure, rubber reinforcing carbon blacks are, for example, ASTM designated rubber reinforcing carbon blacks as exemplary N121 and N205 carbon blacks. Examples of various rubber reinforcing carbon blacks together with their Iodine number values and DBP values, may be found in *The Vanderbilt Rubber Handbook*, (1990), 13th edition, Pages 416 through 419.

Use of the small sized, high structure, rubber reinforcing carbon black(s), with such Iodine adsorption value range and DBP value range, is considered herein to be important in order to promote good abrasion resistance, or coefficient of friction, and higher stiffness for the tire tread to promote cornering and handling of the tire.

In practice, it is envisioned that the cis 1,4-polybutadiene elastomer may be a neodymium catalyst prepared cis 1,4-polybutadiene rubber which may be prepared, for example, by polymerization of 1,3-polybutadiene monomer in an organic solvent solution in the presence of a catalyst system comprised of neodymium compound.

Representative of such neodymium catalyst prepared cis 1,4-polybutdiene is, for example, and not intended to be limiting, BUD 1223™ from The Goodyear Tire & Rubber Company and CB25™ from Lanxess.

In one embodiment, it is envisioned that said functionalized polybutadiene elastomer may be a neodymium catalyst prepared functionalized polybutadiene elastomer.

Exemplary of such neodymium catalysis is, for example and not intended to be limiting, a combination of a neodymium compound and an aluminum alkyl and an aluminum chloride delivering compound. Representative of neodymium compounds might be, for example, neodymium neodecanoate, neodymium octanoate or neodymium versalate. The neodymium compounds might be derived from a neodymium carboxylate soap such as, for example Nd(R—COO)$_3$. Representative of aluminum alkyl compounds may be, for example, triisobutylaluminum (TIBA) and diisobutylaluminum hydride (DIBAH). Representative of aluminum chloride delivering compounds may be, for example, diethylaluminum chloride.

Therefore, such exemplified catalyst for preparation of the functionalized polybutadiene elastomer is exclusive of titanium, cobalt or nickel based catalysts which might be sometimes used for preparation of cis 1,4-polybutadiene elastomers.

The end-chain functionalization of the cis 1,4-polybutadiene rubber may be introduced, for example, onto the polybutadiene elastomer by a polymerization terminating agent which terminates the cis 1,3-butadiene polymerization and provides the functional group.

The in-chain functionalization of the cis 1,4-polybutadiene rubber may be introduced, for example, as a small amount of co-monomer which provides the functional group as it co-polymerizes with the cis 1,3-butadiene monomer.

For this evaluation, of inclusion of functionalized cis 1,4-polybutadiene in the rubber composition is to promote reaction of the functionalized polybutadiene rubber with the precipitated silica (e.g. the hydroxyl groups contained on the precipitated silica and on the pre-hydrophobated precipitated silica) to further bond the precipitated silica to the elastomer to promote reinforcement of the rubber, and for which it is found to promote beneficial processability of the uncured rubber composition together with promotion of beneficially higher rebound values for the cured rubber composition which is predictive of lower hysteresis for the rubber composition and thereby lower internal heat generation during the tire service, with a resultant lower predictive temperature build-up for the rubber composition when it is being worked during tire service and predictive of better (lower) rolling resistance for a tire with a tread of such rubber composition which contains the functionalized polybutadiene rubber. A further purpose is to promote greater abrasion resistance of the rubber composition which is predictive of better resistance to treadwear for a tire with such rubber composition which contains the functionalized polybutadiene rubber.

Accordingly, in one aspect of the invention, as previously indicated, the precipitated silica (pre-hydrophobated precipitated silica or precipitated silica hydrophobated in situ within the rubber composition) is bonded to said functionalized cis 1,4-polybutadiene rubber through hydroxyl groups on said precipitated silica.

Representative of a functionalized cis 1,4-polybutadiene rubber is envisioned as being, for example, and not intended to be inclusive, BR54™ from JSR. While the technical aspect may not be fully understood, it is a feature of this invention that the functionalized cis 1,4-polybutadiene rubber is differentiated from other cis 1,4-polybutadiene rubbers in a sense of having functionalization which is reactive with hydroxyl groups contained on said precipitated silica (said precipitated silica and said pre-hydrophobated precipitated silica).

As indicated, it is desired that the cis 1,4-polybutadiene as well as the functionalized cis 1,4-polybutadine is a polybutadiene rubber prepared by neodymium catalysis of cis 1,3-butadiene monomer.

Such cis 1,4-polybutadiene is intended to be distinguished from polybutadiene prepared by organic solution nickel catalysis of cis 1,3-butadiene monomer (a "nickel" polybutadiene rubber).

In one embodiment, such "nickel" polybutadiene rubber might be described as, for example, having microstructure comprised of at least 90 percent cis 1,4-isomeric content with a typical Tg (glass transition temperature) in a range of from about −100° C. to −110° C. and may have a number average (Mn) molecular weight in a range of from about 230,000 to about 250,000 with a heterogeneity index (Mw/Mn) in a range of from about 1.5/1 to about 2/1. For example, see U.S. Pat. No. 7,081,505.

In one embodiment, cis 1,4-polybutadiene rubber prepared by such neodymium catalysis of 1,3-butadiene might be described, for example, having a microstructure comprised of about at least 95 percent cis 1,4-isomeric units with a typical Tg (glass transition temperature) in a range of from about −100° C. to −110° C. and may have a number average molecular weight (Mn) in a range of from about 150,000 to about 200,000 (a relatively low Mn for a cis 1,4-polybutadiene elastomer) and a heterogeneity index (Mw/Mn) in a range of from about 1.5/1 to about 2.2/1 (a relatively moderate heterogeneity index range illustrating a moderate disparity between its number average and weight average molecular weights).

The precipitated silica is a synthetic amorphous silica such as, for example, those obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, fatty acid comprised of, for example, stearic, oleic, palmitic, and possibly linolenic acids, zinc oxide, sulfur-contributing material(s) and vulcanization accelerator(s) as hereinbefore mentioned.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 165° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following examples in which the parts and percentages are by weight unless otherwise indicated.

EXAMPLE I

Rubber compositions were prepared to provide examples of rubber compositions containing cis 1,4-polybutadiene rubber or functionalized cis 1,4-polybutadiene rubber and natural rubber together with reinforcing filler comprised of precipitated silica and silica coupler (coupling agent) to hydrophobate the precipitated silica in situ within the rubber composition.

The rubber compositions are referred in this Example as Comparative rubber Sample A and Experimental rubber Samples B and C.

Rubber Sample A is comprised of neodymium catalysis prepared cis 1,4-polybutadiene rubber and natural rubber together with reinforcing filler comprised of precipitated silica and a significant content of rubber reinforcing carbon black together with a silica coupling agent for hydrophobation of the precipitated silica in situ within the rubber composition.

Experimental rubber Sample B, in contrast to rubber Sample A, contains a cis 1,4-polyputadiene rubber as a functionalized cis 1,4-polybutadiene rubber.

Experimental rubber Sample C is the same as Experimental rubber Sample B except that only a minimal amount (3 phr) of rubber reinforcing carbon black is used.

The basic rubber composition formulation is shown in Table 1 and the ingredients are expressed in parts by weight per 100 parts rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature in a range of from about 145° C. to about 160° C. If desired, the rubber mixture may then be mixed in additional non-productive mixing stages (NP-2 or more) in an internal rubber mixer for about 4 minutes to a temperature of, for example, in a range of from about 145° C. to about 160° C. For the additional mixing stages for this Example, addition of one or more of the ingredients reported in the following Table 1 may divided between the first non-productive mixing stage and additional non-productive mixing stage and one or more of the mixing stages may amount to only re-mixing rubber composition without additional ingredient addition. For this example, from 3 to 4 sequential non-productive missing stages were used followed by one productive mixing stage.

The resulting rubber mixture may then mixed in a productive mixing stage (PR) in an internal rubber mixer with addition of sulfur and sulfur cure accelerator(s) for about 2 minutes to a temperature of about 110° C. The rubber composition may then be sheeted out and cooled to below 50° C. between each of the non-productive mixing steps and prior to the productive mixing step. Such rubber mixing procedure is well known to those having skill in such art.

TABLE 1

| | Parts (phr) | | |
|---|---|---|---|
| | A | B | C |
| Non-productive Mix Steps (NP1, et al) | | | |
| Neodymium prepared cis 1,4-polybutadiene rubber[1] | 80 | 0 | 0 |
| Functionalized cis 1,4-polybutadiene rubber[2] | 0 | 80 | 80 |
| Natural cis 1,4-polyisoprene rubber (TTR20) | 20 | 20 | 20 |
| Carbon black (N121) | 35 | 35 | 3 |
| Silica, precipitated[3] | 25 | 25 | 60 |
| Silica coupling agent[4] | 3 | 3 | 7.2 |
| Oil, rubber processing[5] | 4 | 4 | 5 |
| Wax microcrystalline and paraffin | 1.5 | 1.5 | 1.5 |
| Fatty acid[6] | 2.5 | 2.5 | 2 |
| Antioxidants | 3.5 | 3.5 | 3.5 |
| Zinc oxide | 3 | 3 | 0 |
| Final Mix Step (PR) | | | |
| Zinc oxide | 0 | 0 | 3 |
| Sulfur | 1 | 1.2 | 1.4 |
| Accelerator(s)[7] | 2 | 2 | 1.7 |

[1]Cis 1,4-polybutadiene rubber (organic solvent solution polymerized 1,3-butadiene monomer in the presence of a neodymium catalyst) as CB25™ from the Lanxess Company having a Tg of about −105° C. and heterogeneity index in a range of from about 1.5/1 to about 2.2/1
[2]Functionalized cis 1,4-polybutadiene rubber as BR54 from JSR
[3]Precipitated silica as Zeosil™ Z1165 MP from Solvay
[4]Silica coupling agent comprised of bis(3-triethoxysilylpropyl) polysulfide having an average of from about 3.4 to about 3.8 connecting sulfur atoms as Si69™ from Evonik. The silica coupling agent content was increased for rubber Sample C because of its increased precipitated silica content.
[5]Rubber processing oil
[6]Mixture comprised of stearic, palmitic and oleic acids
[7]Sulfenamide with diphenyl guanidine sulfur cure accelerators with retarder as needed The following Table 2 represents the uncured and cured behavior and various physical properties of the rubber compositions for the Comparative rubber Sample A and Experimental rubber Samples B and C.

TABLE 2

| | Rubber Samples (phr) | | |
|---|---|---|---|
| | A | B | C |
| Properties | | | |
| Neodymium prepared cis 1,4-polybutadiene rubber | 80 | 0 | 0 |
| Functionalized cis 1,4-polybutadiene rubber | 0 | 80 | 80 |
| Natural cis 1,4-polyisoprene rubber | 20 | 20 | 20 |
| Carbon black (N121) | 35 | 35 | 3 |
| Silica, precipitated | 25 | 25 | 60 |
| Total mixing stages (4 non-productive + 1 productive) | 5 | 5 | 5 |
| Processing Ability RPA (Rubber Process Analyzer) Test[1] | | | |
| Uncured G' (0.83 Hertz, 15% strain, 100° C.), MPa | 225 | 200 | 226 |
| Rubber Properties RPA (Rubber Process Analyzer) Test[1] Dynamic Storage Modulus (G') | | | |
| Cured rubber G' (1 Hertz, 10% strain, 100° C.), MPa | 1.8 | 1.8 | 2.1 |
| Tan delta (1 Hertz, 10% strain, 100° C.) | 0.105 | 0.103 | 0.096 |
| Stress-strain, ATS[2] | | | |
| 100% modulus, ring, (MPa) | 2.4 | 2.4 | 2.3 |
| 300% modulus, ring, (MPa) | 10.5 | 10.9 | 8.9 |
| Tensile strength (MPa) | 17.4 | 17.3 | 16.4 |
| Elongation at break (%) | 461 | 444 | 494 |
| Rebound (Zwick) | | | |
| 23° C. | 53 | 53 | 55 |
| 100° C. | 63 | 63 | 62 |
| Shore A Hardness | | | |

TABLE 2-continued

| | Rubber Samples (phr) | | |
|---|---|---|---|
| | A | B | C |
| 23° C. | 67 | 65 | 65 |
| Tear strength (tear resistance)[3], N at 95° C. | 221 | 190 | 141 |
| Aged (7 days,/70° C.) tear strength[3], N at 95° C. | 105 | 113 | 106 |
| Abrasion rate (mg/km), Grosch[4] high severity (70 N), 12° slip angle, speed = 20 km/hr., distance = 250 m | 303 | 304 | 381 |

[1]RPA, rubber property analytical instrument
[2]Automated Test System instrument (ATS), Instron Corporation, which incorporates a number of tests in one analytical system and reports data from the tests such as, for example, ultimate tensile strength, ultimate elongation, modulii and energy to break data
[3]Data obtained according to a tear strength (peal adhesion), or tear resistance test. The tear resistance may be determined by ASTM D1876-01 taken with DIN 53539 using a 5 mm wide tear width provided by a longitudinal open space, sometimes referred to as a window, cut or otherwise provided, in the film positioned between the two rubber test pieces where the window provides a geometrically defined area, namely tear width, for portions of two rubber test pieces to be pressed and cured together after which the ends of the two test pieces are pulled apart at right angles (90° + 90° = 180° to each other) and the force to pull the test pieces apart is measured. An Instron instrument may be used to pull the rubber pieces apart using an Instron instrument at 95° C. with the force required being reported as Newtons force.
[4]The Grosch high severity abrasion rate may be conducted on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a high abrasion severity test may be run, for example, at a load of 70 Newtons, 12° slip angle, disk speed of 20 km/hr and distance of 250 meters.

From Table 2 it is seen that the uncured G' of rubber Sample B with 80 phr of functionalized cis 1,4-polybutadiene rubber is significantly lower than that of the Control rubber Sample A.

From Table 2 it is also seen that the hysteresis of the cured rubber composition (indicated by the similar rebound and lower tan delta properties) and similar Grosch abrasion rate resistance of Experimental rubber Sample (B) are mostly similar to rubber Sample (A).

It is concluded that the processing of the Experimental rubber Sample (B) containing the functionalized cis 1,4-polybutadiene rubber is significantly beneficially better than that of the Comparative rubber Sample (A) while substantially maintaining the indicated cured rubber properties.

EXAMPLE II

Rubber compositions were prepared to provide examples of rubber composition comprised of functionalized cis 1,4-polybutadiene rubber and 20 phr of natural rubber together with filler reinforcement comprised primarily of precipitated silica and only a minimal rubber reinforcing carbon black content (3 phr).

For rubber Sample D, the precipitated silica was provided with a coupling agent for the precipitated silica to be hydrophobated in situ within the rubber composition.

For rubber Sample E, the precipitated silica was provided as a pre-hydrophobated precipitated silica (hydrophobated prior to its addition to the rubber composition. For rubber Sample E, a small amount of additional coupling agent was added to the rubber composition to further hydrophobate the pre-hydrophobated precipitated silica.

The basic rubber composition formulation is shown in Table 3 and the ingredients are expressed in parts by weight per 100 parts rubber (phr) unless otherwise indicated.

The rubber compositions may be prepared in a manner similar to Example I.

TABLE 3

| | Parts (phr) | |
|---|---|---|
| | D | E |
| Non-productive Mix Steps (NP1 et al) | | |
| Functionalized cis 1,4-polybutadiene rubber[1] | 80 | 80 |
| Natural cis 1,4-polyisoprene rubber (TTR20) | 20 | 20 |
| Carbon black (N121) | 3 | 3 |
| Silica, precipitated[2] | 60 | 0 |
| Pre-hydrophobated precipitated silica[3] | 0 | 60 |
| Silica coupling agent[4] | 7.2 | 3.6 |
| Oil, rubber processing | 5 | 5 |
| Wax microcrystalline and paraffin | 1.5 | 1.5 |
| Fatty acid[5] | 2.5 | 2.5 |
| Antioxidants | 3.5 | 3.5 |
| Final Mix Step (PR) | | |
| Zinc oxide | 3 | 3 |
| Sulfur | 1.2 | 1 |
| Accelerator(s)[6] | 2 | 2 |
| Zinc dibenzyl dithiocarbamate | 0 | 0.1 |

[1]Functionalized cis 1,4-polybutadiene rubber as BR54 ™ from JSR Corporation
[2]Precipitated silica as Zeosil ™ Z1165 MP from Solvay
[3]Pre-hydrophobated precipitated silica as Agilon 458 ™ from PPG
[4]Silica coupling agent comprised of bis(3-triethoxysilylpropyl) polysulfide having an average of from about 3.4 to about 3.8 connecting sulfur atoms as Si69 ™ from Evonik
[5]Mixture comprised of stearic, palmitic and oleic acids
[6]Sulfenamide with diphenyl guanidine sulfur cure accelerators with retarder as needed The following Table 4 represents the uncured and cured behavior and various physical properties of the rubber Samples D and E.

TABLE 4

| | Rubber Samples (phr) | |
|---|---|---|
| | D | E |
| Properties | | |
| Functionalized cis 1,4-polybutadiene rubber | 80 | 80 |
| Natural cis 1,4-polybutadiene rubber | 20 | 20 |
| Carbon black (N121) | 3 | 3 |
| Silica, precipitated | 60 | 0 |
| Pre-hydrophobated precipitated silica | 0 | 60 |
| Total mixing stages (3 nonproductive + 1 productive) | 4 | 4 |
| Processing Ability | | |
| RPA (Rubber Process Analyzer) Test[1] | | |
| Uncured G' (0.83 Hertz, 15% strain, 100° C.), MPa | 325 | 247 |
| Rubber Properties | | |
| RPA (Rubber Process Analyzer) Test[1] | | |
| Dynamic Storage Modulus (G') | | |
| Cured rubber G' (1 Hertz, 10% strain, 100° C.), MPa | 1.8 | 1.6 |
| Tan delta (1 Hertz, 10% strain, 100° C.) | 0.076 | 0.065 |
| Stress-strain, ATS[2] | | |
| 100% modulus, ring, (MPa) | 2.3 | 2.3 |
| 300% modulus, ring, (MPa) | 10.4 | 9.9 |
| Tensile strength (MPa) | 14.2 | 12.4 |
| Elongation at break (%) | 385 | 361 |
| Rebound (Zwick) (Higher is Better Indicating Lower Hysteresis) | | |
| 23° C. | 60 | 60 |
| 100° C. | 68 | 72 |
| Shore A Hardness | | |
| 23° C. | 68 | 66 |
| Tear strength (tear resistance), N at 95° C. | 115 | 101 |
| Aged (7 days, 70° C.) tear | 86 | 63 |

TABLE 4-continued

| | Rubber Samples (phr) | |
|---|---|---|
| | D | E |
| strength, N at 95° C. | | |
| Abrasion rate (mg/km), Grosch high severity (70 N), 12° slip angle, speed = 20 km/hr., distance = 250 m | 354 | 439 |

From Table 4 it is seen that the processing indicator (uncured G') of the rubber Sample E containing the reinforcing filler comprised of pre-hydrophobated precipitated silica and minimal rubber reinforcing carbon back content is significantly beneficially lower, and therefore better than that of the rubber Sample D hydrophobated in situ within the rubber composition.

From Table 4 it is also seen that the hysteresis (higher 100° C. rebound and lower tan delta indicators) of rubber Sample E containing the pre-hydrophobated precipitated silica reinforcement is beneficially lower than the rubber Sample D containing the precipitated silica hydrophobated in situ within the rubber composition.

It is concluded that the compound Sample E containing the functionalized cis 1,4-polybutadiene rubber and reinforcing filler comprised of the pre-hydrophobated precipitated silica with minimal rubber reinforcing carbon black yielded significantly improved rubber processing for the uncured rubber composition together with beneficially lower indicated hysteresis for the cured rubber composition without significantly sacrificing most other cured rubber properties.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential rubber tread intended to be ground-contacting where said tread is a rubber composition, comprised of, based on parts by weight per 100 parts by weight of the tread rubber (phr):
   (A) conjugated elastomer(s) comprised of:
      (1) about 50 to about 80 phr of elastomers comprised of:
         (a) about 50 to about 80 weight percent of functionalized cis 1,4-polybutadiene rubber,
            wherein said functionalized cis 1,4-polybutadiene rubber is end-chain functionalized,
            wherein functional groups for said functionalized cis 1,4-polybutadiene rubber are comprised of at least one of amine, siloxy, thiol, imine, amide and epoxy groups reactive with hydroxyl groups on said precipitated silica, and
         (b) from about 20 to about 50 weight percent of non-functionalized cis 1,4-polybutadiene rubber, and
      (2) from about 20 to about 50 phr of additional conjugated diene-based elastomer comprised of:
         (a) about 40 to about 100 weight percent cis 1,4-polyisoprene rubber, wherein said cis 1,4-polyisoprene rubber is comprised of natural cis 1,4-polyisoprene rubber and/or synthetic cis 1,4-polyisoprene rubber, and
         (b) from zero to about 60 weight percent styrene/butadiene rubber, and
   (B) about 40 to about 110 phr of reinforcing filler comprised of a combination of precipitated silica and rubber reinforcing carbon black limited to about 2 to about 15 phr of said rubber reinforcing carbon black,
   wherein said precipitated silica is comprised of precipitated silica pre-hydrophobated with a coupling agent having a moiety reactive with hydroxyl groups on said precipitated silica and another different moiety interactive with said diene-based elastomer(s);
   wherein said precipitated silica is pre-hydrophobated by reaction with said coupling agent prior to addition to said rubber composition;
   wherein said coupling agent for said pre-hydrophobation of said precipitated silica is comprised of bis (3-trialkoxysilylpropyl) polysulfide containing an average of from 2 to about 3.8 connecting sulfur atoms in its polysulfidic bridge or comprised of an alkoxyorganomercaptosilane.

2. The tire of claim 1 wherein said pre-hydrophobated precipitated silica is bonded to said functionalized cis 1,4-polybutadiene rubber by said functional group(s) of said functionalized cis 1,4-polybutadiene rubber through hydroxyl groups contained on said pre-hydrophobated precipitated silica.

3. The tire of claim 1 wherein said coupling agent for said pre-hydrophobated precipitated silica is comprised of said bis(3-trialkoxysilylpropyl) polysulfide.

4. The tire of claim 3 wherein said bis(3-trialkoxysilylpropyl) polysulfide is a bis(3-triethoxysilylpropyl) polysulfide.

5. The tire of claim 1 wherein said coupling agent for said pre-hydrophobated precipitated silica is an alkoxyorganomercaptosilane.

* * * * *